United States Patent
Schomberg

(10) Patent No.: US 6,542,573 B2
(45) Date of Patent: Apr. 1, 2003

(54) METHOD AND DEVICE FOR THE RECONSTRUCTION OF THREE-DIMENSIONAL IMAGES FROM CONE BEAM PROJECTION DATA

(75) Inventor: Hermann Schomberg, Hamburg (DE)

(73) Assignee: Koninklijke Philips Electronics N.V. (NL)

( * ) Notice: Subject to any disclaimer, the term of this patent is extended or adjusted under 35 U.S.C. 154(b) by 0 days.

(21) Appl. No.: 10/116,784

(22) Filed: Apr. 4, 2002

(65) Prior Publication Data

US 2002/0150201 A1 Oct. 17, 2002

(30) Foreign Application Priority Data

Apr. 4, 2001 (DE) .......................................... 101 16 682

(51) Int. Cl.[7] .................................................. A61B 6/03
(52) U.S. Cl. .............................. 378/19; 378/8; 378/901
(58) Field of Search ............................ 378/4, 8, 15, 19, 378/901

(56) References Cited

U.S. PATENT DOCUMENTS

| 5,640,436 A | 6/1997 | Kawai et al. .................. 378/4 |
| 5,689,629 A | * 11/1997 | Lee ............................. 345/427 |

OTHER PUBLICATIONS

Robert M. Lewitt; "Processing of incomplete measurement data in computed tomography [a)]"; Med. Phys. 6(5), Sep./Oct. 1979; pp. 412–417.

* cited by examiner

Primary Examiner—David V. Bruce
(74) Attorney, Agent, or Firm—John J. Fry; Thomas M. Lundin

(57) ABSTRACT

The invention relates to a method of reconstructing three-dimensional images from cone beam projection data of an object to be examined which is arranged in an examination zone. In practice cone beam projections are usually cut off, because the object to be examined usually cannot be imaged completely in all imaging positions. An image which is reconstructed exclusively from the acquired projection data, therefore, does not have the highest possible image quality. In order to continue the projection data beyond the sensitive detector surface and hence obtain images of higher image quality, therefore, the invention proposes a method which includes the following steps:

Figure 1:
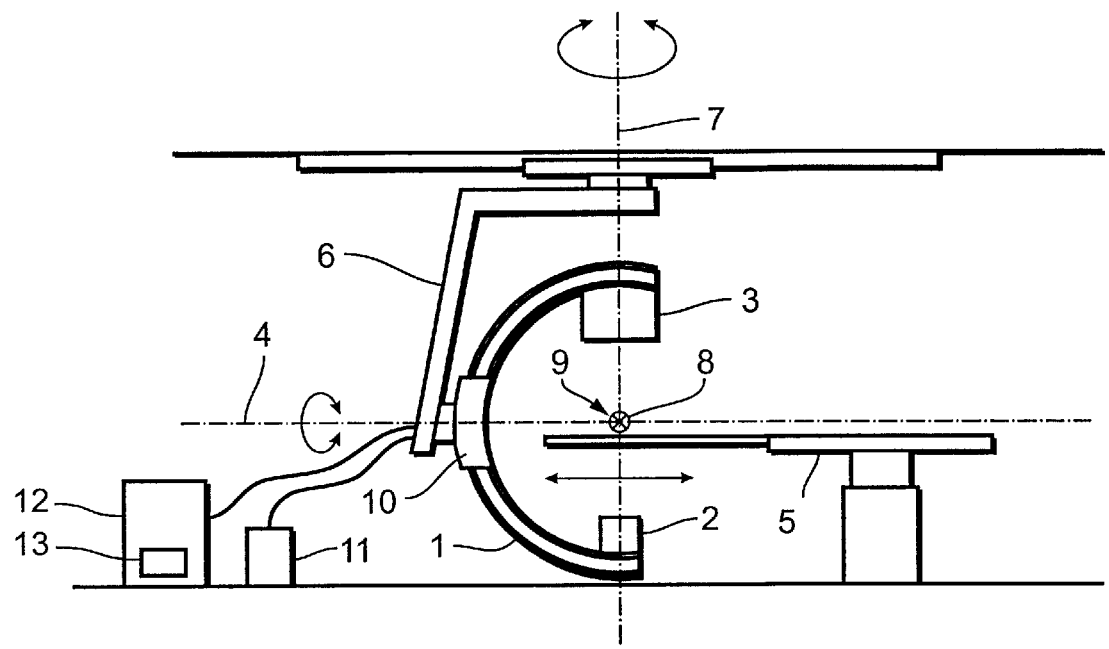

(a) acquiring the cone beam projection data,
(b) determining the contour of the sensitive detector surface,
(c) determining pseudo-projection data in an overall outer zone from the projection data acquired, and
(d) reconstructing a three-dimensional image from the projection data and the pseudo-projection data.

12 Claims, 3 Drawing Sheets

METHOD AND DEVICE FOR THE RECONSTRUCTION OF THREE-DIMENSIONAL IMAGES FROM CONE BEAM PROJECTION DATA

BACKGROUND

The invention relates to a method of reconstructing three-dimensional images from cone beam projection data of an object to be examined which is arranged in an examination zone, and also relates to a corresponding X-ray device.

For the imaging in an X-ray device, for example a C-arm system, in principle a set of cone beam projection data is acquired first from the part of an object to be imaged and the three-dimensional distribution of the X-ray attenuation coefficient within the part of the object to be imaged can subsequently be reconstructed therefrom. This distribution then serves as a 3D image of this part of the object to be examined, that is, of the so-called examination zone. In the case of medical applications the object to be examined is usually a human body. The cone beam used for the projection is formed by a substantially punctiform X-ray source (the apex of the cone) and the sensitive surface of the X-ray detector (the base of the cone) which is possibly reduced by diaphragms. The examination zone of the object to be examined is then situated between the X-ray source and the X-ray detector. The X-ray source and the X-ray detector in a commonly used isocentric C-arm system are connected essentially rigidly to one another, the connecting line between the X-ray source and the center of the X-ray source always passing more or less exactly through the isocenter.

The position of the X-ray source, and hence the orientation of the cone beam, can be chosen at random within given limits which are imposed by the construction. In order to acquire a set of cone beam projection data, the X-ray source is displaced along a predetermined trajectory around the examination zone to be imaged, one cone beam projection after the other being measured at short intervals in time or in space during said displacement. Because of the construction, the trajectory is situated at least approximately on the surface of a sphere whose center is formed by the isocenter of the C-arm system.

For a predetermined trajectory C-arm systems of this kind have a spherical volume having the following three properties: the center of the spherical volume is formed by the isocenter; the spherical volume is covered by all cone beams whose apex is situated on the trajectory; the spherical volume is the largest sphere having both these properties. The diameter of this sphere hardly depends on the choice of the trajectory, but is highly dependent on the dimensions of the detector and some other geometrical parameters. In practice the diameter is between 20 and 30 cm. Because a human body does not fit into such a small sphere, the cone beam projections are necessarily cut off, meaning that the cone beam does not cover the entire body.

When the trajectory is suitably chosen, each plane which intersects the sphere also intersects the trajectory. A trajectory having this property is often also referred to as being complete in relation to this sphere. Suitably constructed C-arm systems are capable of realizing trajectories which are complete in relation to the sphere. Thus, if the trajectory were complete in relation to the sphere and the projections were not cut off, the image of the part of the object to be examined which is situated within the sphere would be unambiguously determined by all cone beam projections along the trajectory. Using a suitable reconstruction algorithm, the image determined in these circumstances could be reliably and accurately reconstructed within the sphere. Such a reconstruction algorithm is disclosed, for example, in the article "A cone beam reconstruction algorithm using shift-variant filtering and cone-beam backprojection", Defrise, M. and Clack, R., IEEE Transactions on Medical Imaging, Vol. 13, No. 1: pp. 187–195, March 1994.

Granted, in practice the trajectory can be configured in such a manner that the condition of completeness is satisfied. The fact that cone beam projections are cut off, however, is inevitable at least for most applications. Consequently, the image of the part of the object to be examined which is situated within the sphere can no longer be unambiguously determined, not even when the trajectory is complete. The true image is to be considered rather as the sum of two images, the first of which is unambiguously determined by the measured components of the cone beam projections and can also be calculated. The second image could also be unambiguously determined by the cut-off components of the cone beam projections, but cannot be calculated because exactly these components of the cone beam projections are missing.

U.S. Pat. No. 5,640,436 discloses a method of continuing cut-off cone beam projections in computed tomography. The trajectory is then formed as a circular path. According to this method it is proposed to continue the cone beam projection data beyond the edge zone, that is, parallel to the plane of the circular path and into an outer zone and to reconstruct images from the continued projections, one-dimensional filtering being performed along the continued lines during the reconstruction.

The one-dimensional continuation can be carried out, for example, by means of a method which is described in the article "Processing of incomplete measurement data in computer tomography", R. M. Lewitt, Medical Physics, 6 (5): pp. 412–417, 1979.

SUMMARY

It is an object of the present invention to provide a reconstruction method of the kind set forth which enables the formation of high-quality three-dimensional images of the desired examination zone also from cut-off cone beam projection data. This object is achieved by means of a reconstruction method of the kind set forth which includes the following steps:

a) acquiring the cone beam projection data by means of an X-ray device which includes an X-ray source and an X-ray detector, the X-ray source being displaced along a trajectory around the examination zone in order to acquire the projection data, b) determining the contour of the sensitive detector surface of the X-ray detector on which the projection data was acquired, c) determining pseudo-projection data in an overall outer zone, enclosing the sensitive detector surface in an annular fashion, from the projection data acquired, and d) reconstructing a three-dimensional image of the examination zone from the projection data acquired on the sensitive detector surface and from the pseudo-projection data determined in the outer zone.

The method in accordance with the invention is based on the recognition of the fact that the described second image, which would be determined by the cut off components of the cone beam projections varies only little and comparatively smoothly inside the spherical volume determined by all cone beam projections. In the vicinity of the edge of the spherical zone, however, it may vary more strongly. A coarse estimate of the cut off components of the cone beam projections would already enable calculation of a usable approximation of this second image within the spherical volume.

The invention utilizes the above insight and hence proposes to supplement in a first step the cut off cone beam projections detected on the sensitive detector surface in such a manner that they may be considered approximately as projections of an imaginary object to be examined which have not been cut off, said object to be examined being situated completely within a larger spherical volume. In order to continue the cut off projections, pseudo-projection data should thus be determined in an outer zone which is filled completely and preferably as uniformly as possible. The larger spherical volume is then chosen to be significantly larger than the former, smaller spherical volume, being the so-called inner zone, but is preferably situated around the same center. The imaginary object to be examined arises from the actual object to be examined by omission of all parts situated outside the larger spherical volume. Furthermore, in accordance with the invention it is proposed to reconstruct in a second step the desired image of the part of the object to be examined which is present within the smaller spherical volume from the supplemented cone beam projections derived during the first step, that is, from the cone beam projection data acquired within the smaller spherical volume and from the pseudo-projection data acquired in the so-called outer zone, that is, the difference volume between the larger and the smaller spherical volume.

A suitable reconstruction algorithm is, for example, once more the algorithm described in the article by Defrise and Clack.

A three-dimensional image reconstructed by means of the method in accordance with the invention deviates from the true image of the part of the object to be examined which is present in the smaller spherical volume, that is in the inner zone, merely in the form of an unknown, but very weak, smooth and almost constant image which varies only to a comparatively small extent, that is, even in the vicinity of the edge of the inner zone. The reconstructed image thus enables the recognition of fine anatomical details, but does not provide absolute numerical values of the X-ray attenuation coefficient. When the image reproduces an organ whose attenuation coefficient is known, however, the image can be normalized afterwards by addition of a suitable constant.

The method in accordance with the invention can also be used when the trajectory is not complete in relation to any sphere; this is the case when the trajectory consists of a circle or a part of a circle. The so-called algebraic reconstruction technique can always be used as the reconstruction algorithm; in the case of a (partial) circle it is also possible to use the known Feldkamp, Davis and Kress algorithm. Generally speaking, in such a case the reconstructed image will contain additional artefacts which are due to the failure to meet the condition of completeness. It is to be noted, however, that the reconstruction can also be limited to a sub-volume of the inner zone.

Preferably, the outer zone is chosen in such a manner that it covers at least a significant part of each cone beam projection of the object to be examined which emanates from an arbitrary point of the trajectory.

A further version of the method in accordance with the invention utilizes only the acquired edge projection data, that is, the projection data acquired in the edge zone of the sensitive detector surface, so as to determine the pseudo-projection data in the outer zone. Moreover, pseudo-projection data is preferably determined only on the basis of directly neighboring edge projection data.

A more or less accurate estimate of the appearance of the object to be examined is used for the determination of the pseudo-projection data, that is, the continuation of the cut off cone beam projections. However, it is advantageous to utilize a priori information concerning the appearance of the object to be examined. A comparatively accurate estimate can be made, for example, by means of additional sensors, for example, tactile or optical sensors or ultrasound sensors.

Whereas in accordance with the method proposed in U.S. Pat. No. 5,640,436 the cone beam projections are continued along parallel lines which extend parallel to the trajectory which is assumed to be circular, in conformity with the version of the method of the invention as disclosed in claim 5 it is proposed to continue the cone beam projections along straight, radial lines whose respective point of origin is situated at or near the center of the sensitive detector surface and which lines, therefore, intersect at that area. The desired complete filling of the outer zone with pseudo-projection data is thus achieved on the one hand. On the other hand, reconstruction methods other than the reconstruction method unconditionally specified in said U.S. Pat. No. 5,640,436 can then be used for the formation of three-dimensional images. Overall, a significantly better resolution can thus be achieved for the images.

In the case of the known X-ray detectors the measured projection data lies situated at grid points of a Cartesian system of co-ordinates or, for example, in the case of an image intensifier, of a distorted Cartesian co-ordinate system. In order to carry out the continuation of the cone beam projections along radial lines, therefore, it is advantageous to determine the acquired projection data first in a polar co-ordinate system, for example, to convert the projection data present in cartesian co-ordinates into polar co-ordinates by linear interpolation. The pseudo-projection data can then be determined in polar co-ordinates and subsequently be converted into the cartesian co-ordinate system of the projection data present in the inner zone, for example, by linear interpolation in the angular direction between pseudo-projection data of neighboring lines.

Different approaches can be followed so as to calculate the pseudoprojection data. One possibility consists in continuing the radial variation of the values of the projection data essentially smoothly in the outer zone and letting it decrease to 0 inside the outer zone. To this end, elliptical curves or other simple continuations can be chosen; this already offers an improvement of the image quality. However, it may also be arranged to determine pseudo-projection data along each radial line in conformity with a more complex formula, for example, by application of a first-order polynomial as indicated in claim 10; in that case a plurality of parameters is used, for example, the width of the edge zone wherefrom edge projection data is used, and the length of the object to be examined along the corresponding radial line which is situated within the contour of the larger spherical volume. A comparatively good continuation of the cone beam projections along the individual radial lines can thus be achieved, ultimately leading to a high image quality.

Further advantageous embodiments are disclosed in the indicated dependent claims. The invention also relates to an X-ray device as disclosed in claim 11. In practice such an X-ray device is preferably realized as a C-arm system or as a so-called computed tomography device equipped with a gantry. It is to be noted that the X-ray device in accordance with the invention may be further elaborated in the same or similar way as the method described above.

DRAWINGS

Figure 2:
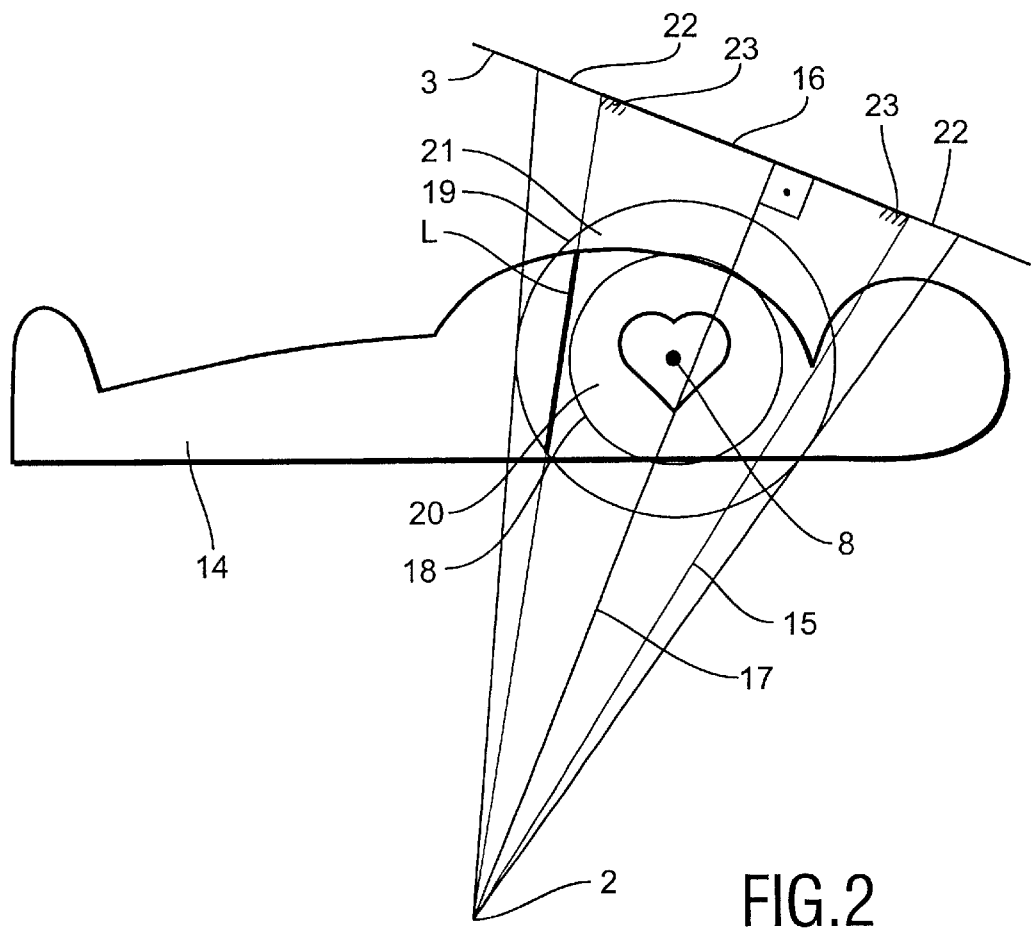
Figure 3:
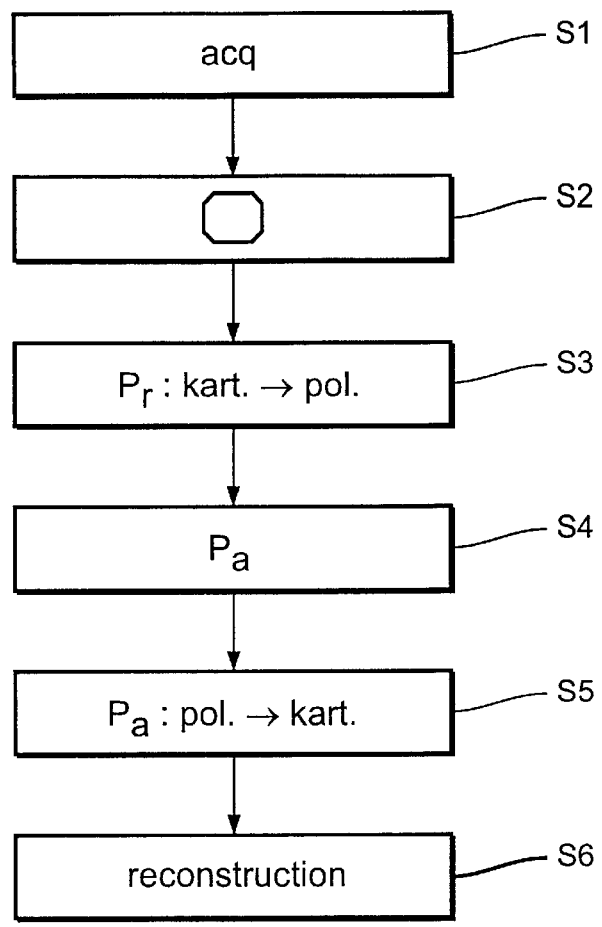
Figure 4:
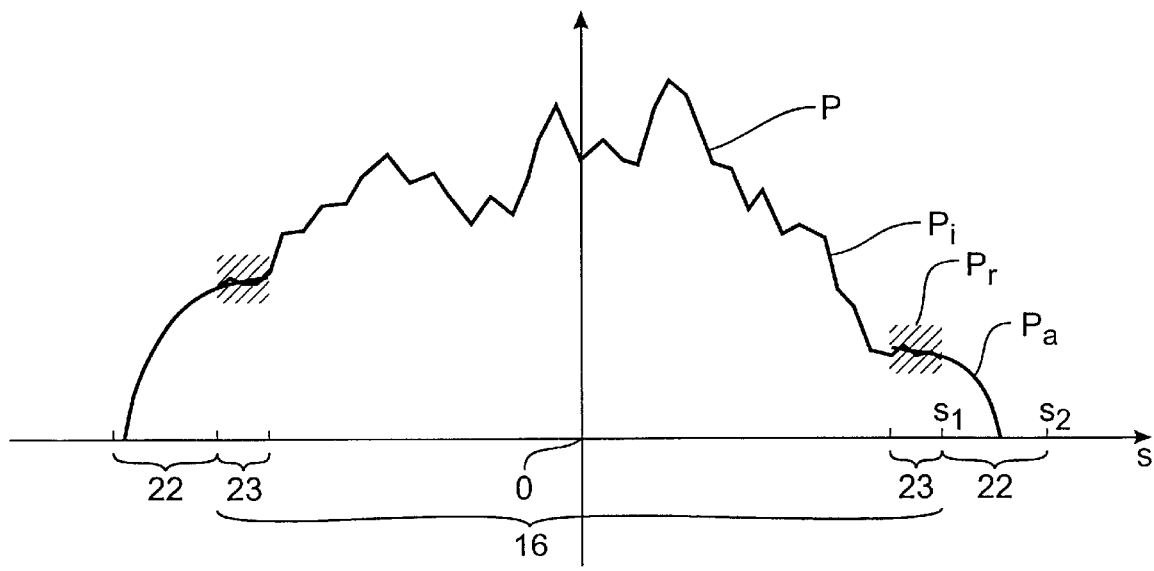
Figure 5A:
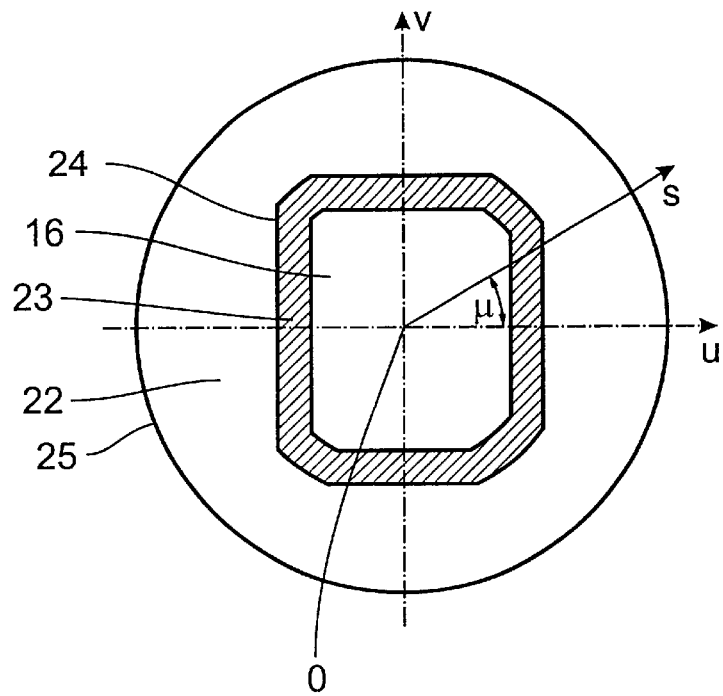
Figure 5B:
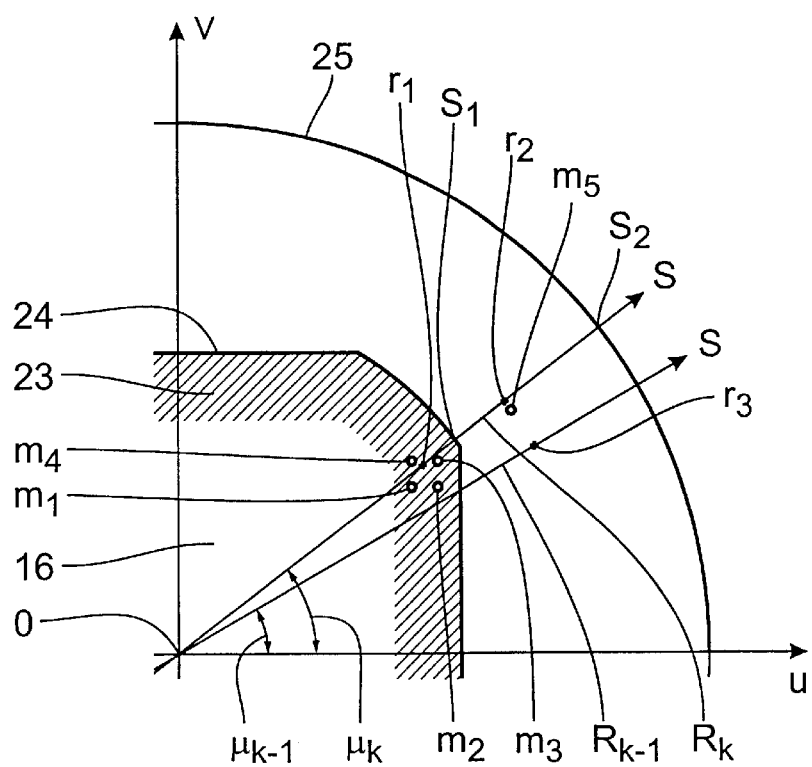

The invention will be described in detail hereinafter with reference to the drawings. Wherein:

FIG. 1 shows a practical embodiment of an X-ray device in accordance with the invention, FIG. 2 shows the imaging geometry illustrating the method in accordance with the invention, FIG. 3 shows a flow chart illustrating a version of the method in accordance with the invention, FIG. 4 shows the variation of the value of projection data as well as their continuation in conformity with the method of the invention, and FIGS. 5a, 5b are enlarged representations of projection data and their continuation.

DESCRIPTION

FIG. 1 shows an X-ray device in accordance with the invention which is constructed as a C-arm system. An X-ray source 2 and an X-ray detector 3 are mounted at opposite ends of the C-arm 1. The C-arm 1 is journaled, by way of a C-arm holder 10, so as to be rotatable about a propeller axis 4 and a C-arm axis 9. In the present representation the C-arm axis 9 is oriented perpendicularly to the plane of drawing and extends through an isocenter 8. The C-arm 1 is journaled, by way of an L-arm 6, so as to be rotatable about an L-arm axis 7. A control unit 11 is provided for control of the X-ray device. Moreover, an arithmetic unit 12 with a reconstruction unit 13 is provided for the processing of the acquired projection data in conformity with the method of the invention, notably for determining pseudo-projection data and for reconstructing desired three-dimensional images.

The X-ray source 2 and the X-ray detector 3 can be rotated around the C-arm axis 9 while at the same time the C-arm holder 10 with the C-arm 1 is rotated around the propeller axis 4 and projection data is acquired from an object to be examined (not shown), for example, a patient who is arranged on a patient table 5 which can be displaced in the horizontal direction. The two drive motions are preferably realized by way of motors and are controlled in such a manner that the X-ray source 2 can be moved along a predetermined path, being a so-called trajectory, around the object to be examined. Examples of trajectories for the acquisition of projection data are two complete, mutually tilted full circles or semi-circles, a helical curve around the propeller axis 4 or also a bent circle around the propeller axis 4. However, a multitude of other trajectories is also possible and feasible.

FIG. 2 shows the imaging geometry on the basis of which the method in accordance with the invention will be described in detail hereinafter. This Figure is a cross-sectional view where the sectional plane contains the isocenter 8 and the perpendicular 17 from the X-ray source 2 to the detector plane 3. Also shown is a conical radiation beam 15 which traverses a part of the patient 14 and yields projection data on the sensitive detector surface 16, that is, the area of the detector which is active for the acquisition of projection data and is not masked, for example, by diaphragms. It also appears that the perpendicular 17 from the X-ray source 2 to the detector plane 3 does not pass exactly through the isocenter 8 but bypasses it at a short distance. This corresponds to the practical case where use is made of, for example, a C-arm device which exhibits different mechanical inaccuracies in dependence on the relevant position of the C-arm. Ideally, however, the perpendicular 17 would pass through the isocenter 8.

The reference numeral 18 denotes a spherical inner zone around the isocenter 8 which corresponds to the previously described inner spherical zone and is situated completely within the spherical X-ray beam 15 in every imaging position along the specified trajectory; from this zone projection data is acquired on the sensitive detector surface 16 in every imaging position. The reference numeral 19 denotes a further spherical zone which is also oriented around the isocenter 8 and, moreover, around the smaller spherical zone 18; its radius is larger than the radius of the sphere 18 but smaller than the smallest distance between the isocenter 8 and the detector plane 3. The radius of the sphere 19, moreover, is preferably chosen to be so large that the cross-section of the body of the patient 14 in the plane perpendicular to the plane of drawing fits into the sphere 19 as completely as possible.

Between the envelope of the smaller sphere 18, enclosing an inner zone 20, and the envelope of the larger sphere 19 there is thus defined an outer zone 21 wherefrom projection data is not acquired in every imaging position along the trajectory. From the outer zone 21 projection data is acquired only in many imaging positions, that is, usually from sub-zones of the outer zone 21 only. The method proposed in accordance with the invention thus aims to continue the cut off projections in this outer zone 21 by mathematically determining so-called pseudo-projection data in the outer zone 21 so as to reconstruct desired images of the examination zone from the projection data acquired from the inner zone 20 and the pseudo-projection data determined for the outer zone 21. As has already been stated, images thus formed will have a resolution that is significantly higher than that of images reconstructed exclusively on the basis of the projection data acquired from the inner zone 20. Granted, not all parts of the object to be examined, that is, of the patient 14, are situated within the sphere 19 when the size of the sphere 19 is chosen as shown; this should actually be the aim in conformity with the above requirement. However; it can be demonstrated that the effect of regions of the object to be examined which are situated further from the actual examination zone, that is, further from the smaller sphere 18, also decreases as the distance increases. Therefore, it suffices to determine the pseudo-projection data in an outer zone 21 of a given size which satisfies the above requirements; even if such data is estimated, the image quality of images of the zones situated inside the sphere 18 is already enhanced.

FIG. 3 shows the essential steps of the method in accordance with the invention symbolically in a flow chart. First of all, in a first step S1 of the method projection data is acquired from the examination zone. The X-ray source 2 is then moved along a predetermined trajectory around the object 14 to be examined and projection data is acquired by the sensitive detector surface 16 at intervals in time or space in known manner. Because the sensitive detector surface is not automatically the same as the complete detector surface, for example, because the edges of the detector may be masked by diaphragms so that, for example, an approximately square sensitive detector surface is obtained, the contour of the sensitive detector surface 16 whereby the projection data was acquired is determined in a second step S2 of the method.

Generally speaking, the projection data lies at positions of a possibly slightly distorted cartesian system of co-ordinates. Because the pseudo-projection data for the outer zone 21 is preferably formed from the acquired projection data by a continuation along radial lines, in a further step S3 the projection data acquired is converted from cartesian co-ordinates to polar co-ordinates, meaning that the projection data present at positions of a cartesian system of co-ordinates is converted into projection data at positions of a polar system of co-ordinates whose origin preferably forms the center of the sensitive detector surface 16. The conversion can be performed, for example, by bilinear interpolation.

In the next step S4 the pseudo-projection data is determined on the basis of the projection data which is now available in polar co-ordinates. This procedure will be described in detail with reference to the FIGS. 4 and 5. FIG. 4 shows, by way of example, the variation of projection data values P along a single line across the sensitive detector surface 16. The variation of the projection data values P may be understood, for example, as the variation along a radial line through the center of the detector in polar co-ordinates after the acquired projection data $P_i$, present only in the zone 16 after data acquisition, have been supplemented in accordance with the invention with pseudo-projection data $P_a$ in the outer zone 22 between the points s1 and s2. Thus, on the basis of the variation P in FIG. 4 it can also be seen that the measured projections (because only the projection data values $P_i$ in the zone 16 were measured) are cut off and are supplemented with pseudo-projection data values $P_a$ in accordance with the invention in such a manner that the variation of the projection data values within the outer zone 22 decreases to zero.

The outer zone 22 in FIG. 4 then corresponds to the projection of the outer zone 21, shown in FIG. 2, onto the detector plane 3. Furthermore, the location s which indicates the location along the line across the detector is also given as a parameter.

In order to determine the pseudo-projection data $P_a$, in accordance with the invention preferably only the so-called edge projection data $P_r$ from an edge zone 23 are used, meaning that use is made of a sub-quantity of the projection data $P_i$ measured along the same line at the edge of the sensitive detector surface 16. This procedure will be described in detail hereinafter with reference to FIG. 5.

FIG. 5a is a plan view of the detector plane 3. The surface 16 which is bounded by the border 24 defines the sensitive detector surface on which the projection data is acquired. The edge zone 23 of the sensitive detector surface 16, wherefrom projection data is preferably used so as to determine the pseudo-projection data in the outer zone 22, is denoted by shading. The outer zone 22 is bounded by the contour line 25 which is a projection of the larger sphere 19 of FIG. 2 onto the detector plane. It is to be noted that the contour line 25 is not necessarily a circle as shown in FIG. 5a, but is dependent essentially on the choice of the volume 19 as well as on the relevant imaging geometry. For the imaging geometry shown in FIG. 2 and for a spherical volume 19, this projection onto the detector plane 3 shown therein would appear as an ellipse. For the sake of simplicity, however, the method will be described in detail hereinafter on the basis of a circular contour 25.

The rectangular contour 24 with cut-off corners is obtained in that the cone beam is limited to this detector zone by way of appropriate diaphragms. FIG. 5a also shows cartesian co-ordinates u, v as well as polar co-ordinates s, $\mu$ which are intended for a further explanation of the method.

FIG. 5b shows a detail of the projection surface shown in FIG. 5a. Therein, two radial lines $R_k$, $R_{k-1}$, which emanate from the origin O, corresponding to the center of the sensitive detector surface 16 or being situated near this center, extend outwards at different angles $\mu_k$, $\mu_{k-1}$. The projection data acquired on the sensitive detector surface 16 is to be continued along these radial lines. As has already been explained, the projection data acquired is situated at points of a cartesian co-ordinate system; this is due to the special configuration of the known X-ray detectors. Points of such a cartesian co-ordinate system are denoted by the references m1, m2, m3, m4 in FIG. 5b. In order to enable the continuation along a radial line, preferably the projection data $P_i$ present in cartesian co-ordinates is first converted into projection data on polar co-ordinates, meaning that a projection data value is determined from the projection data present at the locations m1 to m4, for example, at the point r1 on the radial line $R_k$. Because in accordance with the invention preferably only the edge projection data $P_r$ acquired in the edge zone 23 are to be evaluated for the calculation of the pseudo-projection data, a plurality of, for example, 5 projection data values is thus determined on the radial line $R_k$ in the zone between s1 and s2, that is, by conversion from projection data measured at cartesian co-ordinate points. Preferably, a projection data value is then determined from the respective neighboring measured projection data values by bilinear interpolation.

In the outer zone 22 the pseudo-projection data $P_a$ is thus determined at several points, for example, at the point r2, from the projection data thus determined in polar co-ordinates. Thus, the projection data $P_i$ which is known in the inner zone 16 is continued along the same radial line in the outer zone 22, that is, as far as the contour line 25. The foregoing operation is performed for all radial lines, so that the outer zone 22 is completely filled with pseudo-projection data, that is, all around the inner zone 16. This also constitutes an essential difference with respect to the method which is known from U.S. Pat. No. 5,640,436 and in which the continuation takes place parallel to the u axis, so that the outer zone 22 is not completely filled with pseudo-projection data, but only in separate subzones, that is, to the left and to the right of the inner zone 16. Thus, in conformity with the method of the invention a significantly larger number of pseudo-projection data is acquired, ultimately leading to an enhanced image quality.

After the measured projection data has been continued into the outer zone 22 along all radial lines R, in a fifth step S5 of the method (see FIG. 3) the pseudo-projection data, now being present in polar co-ordinates, for example, in the positions r2, r3, is converted into cartesian co-ordinates. To this end, for example, a linear interpolation can be performed in the angular direction between neighboring lines $R_k$, $R_{k-1}$. This is shown, by way of example, for the co-ordinate point m5 whose associated pseudo-projection data value is determined from the pseudo-projection data values calculated in polar co-ordinates at the points r2 and r3. The measured projection data values $P_i$ as well as the pseudo-projection data values $P_a$ are thus ultimately available in the same cartesian co-ordinates, thus enabling a reconstruction of desired three-dimensional images in the last step S6 of the method (see FIG. 3) by means of known reconstruction methods, for example, the previously mentioned reconstruction method according to Defrise and Clack.

The continuation of the projection data in the outer zone 22 as shown in the FIGS. 4 and 5b can also be performed in a different manner in accordance with the invention. The continuation along the radial line should preferably take place in such a manner that the projection data variation P shown in FIG. 4 continues smoothly at the transition from the edge zone 23 to the outer zone 22 and decreases to zero within the outer zone, that is, before it reaches the contour line 25. A simple possibility consists in continuing the variation by way of an elliptical curve in the outer zone 22.

A further possibility consists in using the following equation for the calculation of the pseudo-projection data r in the outer zone:

$$r(s,\mu_k)=(c1(\mu_k)+c2(\mu_k)s)L(s,\mu_k) \text{ for } s1<s<s2,$$

where:
r is the pseudo-projection data value searched,
$\mu_k$ denotes the angle of the $k^{th}$ radial line R in the polar co-ordinate system,
s denotes the position of a point along a radial line,
s1 and s2 determine the width of the outer zone in which pseudo-projection data is determined,
$L(s,\mu_k)$ indicates the length of the object to be examined along the $k^{th}$ radial line which is situated inside the contour of the outer zone, and
c1 and c2 are parameters to be determined by determination of the minimum of a sum of error squares.

The length $L(s,\mu_k)$ of the object to be examined along a radial line inside the contour line 19 of the outer zone 21 is shown by way of example in FIG. 2. In order to enable this length to be indicated in the above equation for the determination of the pseudo-projection data, it is necessary to make an estimate of the three-dimensional shape of the body of the object to be examined, that is, at least of the part of the object to be examined which is situated within the volume 19. The appearance of the body can either be estimated or be determined by means of suitable means, for example, an ultrasound device or suitable optical or tactile sensors.

Using the above equation, the parameters c1 and c2 are determined (for each radial line) for each point in the outer zone at which a pseudo-projection data value is to be determined. For example, the parameters c1 and c2 can be chosen in such a manner that the mean quadratic deviation of the function $r(s,\mu_k)$ for the projection data $P_r$ along the $k^{th}$ radial line in the edge zone 23 is minimized (least squares fit). The values of c1 and c2 thus determined are then inserted in the above equation, resulting in the ideal pseudo-projection data value for the position in the outer zone 22 which is defined by the parameters s and $\mu_k$.

Evidently, the parameters c1 and c2 in the above equation can also be determined by means of a different mathematical method. Moreover, instead of the above equation, utilizing a first-order polynomial in which the location s thus occurs with the power one, polynomials of higher or lower order can also be used so as to determine the pseudo-projection data values. Furthermore, it is also possible to make the edge zone wherefrom the projection data is evaluated wider or narrower; for example, all projection data along a line can also be used to determine the pseudo-projection data along the same line. Furthermore, it is also feasible to utilize not only projection data along the same line in order to determine the pseudo-projection data, but also, for example, projection data from neighboring lines.

Not only a C-arm X-ray device as shown in FIG. 1 can be used for the acquisition of the projection data, but also a conventional computed tomography apparatus with a flat detector. In the X-ray device in accordance with the invention the detector is preferably configured as a digital two-dimensional detector; however, a conventional image intensifier may also be used. In that case, however, the fact must be taken into account that the projection data acquired is then situated along a curved cartesian co-ordinate system.

The method in accordance with the invention enables a significantly improved image quality to be achieved in comparison with the known method. In particular fine anatomical details can be reproduced better in images thus formed.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A method of reconstructing three-dimensional images from cone beam projection data of an object to be examined which is arranged in an examination zone, which method includes the steps of:
   (a) acquiring the cone beam projection data by means of an X-ray device which includes an X-ray source and an X-ray detector, the X-ray source being moved along a trajectory around the examination zone in order to acquire the projection data,
   (b) determining the contour of the sensitive detector surface of the X-ray detector on which the projection data was acquired,
   (c) determining pseudo-projection data in an overall outer zone, enclosing the sensitive detector surface in an annular fashion, from the projection data determined, and
   (d) reconstructing a three-dimensional image of the examination zone from the projection data acquired on the sensitive detector surface and from the pseudo-projection data determined in the outer zone.

2. A method as claimed in claim 1, wherein the outer zone is chosen in such a manner that it covers at least a significant part of each cone beam projection of the object to be examined which emanates from an arbitrary point of the trajectory.

3. A method as claimed in claim 1, wherein the pseudo-projection data is determined while utilizing the edge projection data acquired in the edge zone of the sensitive detector surface.

4. A method as claimed in claim 1, wherein the pseudo-projection data is determined while utilizing a priori information concerning the appearance of the object to be examined.

5. A method as claimed in claim 1, wherein the pseudo-projection data is acquired by continuing the projection data acquired on the sensitive detector surface essentially along straight radial lines whose respective point of origin is situated at or near the center of the sensitive detector surface.

6. A method as claimed in claim 5, wherein the projection data is acquired by the X-ray detector in positions of a cartesian or a distorted cartesian system of co-ordinates and that the projection data situated in the edge zone is converted into projection data in positions of a polar system of co-ordinates in order to determine the pseudo-projection data, the origin of the latter system being situated at or near the center of the sensitive detector surface.

7. A method as claimed in claim 6, wherein the pseudo-projection data in line positions of a straight line in the outer zone is determined from the projection data determined in the line positions of the same radial line in the edge zone of the sensitive detector surface.

8. A method as claimed in claim 5, wherein the pseudo-projection data is converted into pseudo-projection data in positions of a cartesian system of co-ordinates prior to the reconstruction of the images.

9. A method as claimed in claim 5, wherein the continuation of the projection data so as to form pseudo-projection data is performed in such a manner that the pseudo-projection data essentially smoothly continues the radial variation of the values of the projection data and decreases to zero within the outer zone.

10. A method as claimed in claim 6, wherein the determination of the pseudo-projection data along a radial line is performed in conformity with the following formula:

$$r(s,\mu_k)=(c1(\mu_k)+c2(\mu_k)s)L(s,\mu_k) \text{ for } s1<s<s2,$$

where r is the pseudo-projection data value searched, $\mu_k$ denotes the angle of the $k^{th}$ radial line in the polar co-ordinate system, s denotes the position of a point along a radial line, s1 and s2 determine the width of the outer zone in which pseudo-projection data is determined, $L(s,\mu_k)$ indicates the length of the object to be examined along the $k^{th}$ radial line which is situated within the contour of the outer zone, and c1 and c2 are chosen to be such that the mean quadratic deviation of the function $r(s,\mu_k)$ for the projection data $(P_r)$ along the $k^{th}$ radial line in the edge zone (23) is minimized.

11. An X-ray device for reconstructing three-dimensional images from cone beam projection data of an object to be examined which is arranged in an examination zone, which device includes (a) an X-ray source and an X-ray detector for the acquisition of cone beam projection data, the X-ray source being moved along a trajectory around the examination zone in order to acquire the projection data, (b) means for determining the contour of the sensitive detector surface of the X-ray detector on which the projection data was acquired, (c) means for determining pseudo-projection data in an overall outer zone, enclosing the sensitive detector surface in an annular fashion, from the projection data determined, and (d) a reconstruction unit for the reconstruction of one or more three-dimensional images of the examination zone from the projection data acquired on the sensitive detector surface and from the pseudo-projection data determined in the outer zone.

12. An X-ray device as claimed in claim 11, including means for determining the appearance of the object to be examined.

* * * * *